(12) United States Patent
Yancy

(10) Patent No.: US 7,533,453 B2
(45) Date of Patent: May 19, 2009

(54) E-FACET OPTICAL LENS

(76) Inventor: Virgil T. Yancy, 8438 S. Allegheny Ave., Tulsa, OK (US) 74137

(*) Notice: Subject to any disclaimer, the term of this patent is extended or adjusted under 35 U.S.C. 154(b) by 722 days.

(21) Appl. No.: 11/041,533

(22) Filed: Jan. 24, 2005

(65) Prior Publication Data

US 2006/0167758 A1 Jul. 27, 2006

(51) Int. Cl.
B23P 5/00 (2006.01)
B23B 41/00 (2006.01)
B23B 35/00 (2006.01)
B23Q 15/00 (2006.01)
B23C 3/00 (2006.01)

(52) U.S. Cl. .............................. 29/557; 29/10; 408/1 R; 408/3; 408/8; 408/13; 408/71; 409/132; 409/84; 409/112; 409/114; 700/169

(58) Field of Classification Search ........... 29/557–558, 29/10, 896.4; 408/1 R, 8, 10, 12, 13, 3, 71, 408/236; 409/131–132, 85, 88, 93, 104, 409/111, 112, 113, 84, 79–80, 114; 451/42–43; 700/9, 169
See application file for complete search history.

(56) References Cited

U.S. PATENT DOCUMENTS

| | | | |
|---|---|---|---|
| 2,354,772 A | 8/1944 | Prange | |
| 4,203,259 A | 5/1980 | Haddock | |
| 4,281,379 A | 7/1981 | Austin | |
| 4,394,099 A | 7/1983 | Santinelli | |
| 4,541,760 A * | 9/1985 | Zoueki | 409/137 |
| 4,557,076 A | 12/1985 | Helbrecht | |
| 4,656,590 A | 4/1987 | Ace | |
| 5,053,971 A | 10/1991 | Wood et al. | |
| 5,231,587 A | 7/1993 | Frost | |
| 5,246,319 A | 9/1993 | Prince et al. | |
| 5,475,910 A * | 12/1995 | Yamamoto | 29/10 |
| 6,020,983 A | 2/2000 | Neu et al. | |
| 6,336,057 B1 | 1/2002 | Obayashi | |
| 6,379,215 B1 * | 4/2002 | Mizuno et al. | 451/5 |
| 6,381,012 B1 * | 4/2002 | Yancy | 356/124 |
| 6,568,990 B2 | 5/2003 | Siders et al. | |
| 6,785,585 B1 * | 8/2004 | Gottschald | 700/159 |
| 2003/0017794 A1 | 1/2003 | Kozakai et al. | |
| 2006/0286902 A1 * | 12/2006 | Covarrubias et al. | 451/5 |

* cited by examiner

Primary Examiner—Erica E Cadugan
(74) Attorney, Agent, or Firm—Head, Johnson & Kachigian

(57) ABSTRACT

A method and system design and manufacture of the monogrammed faceted and stone adorned eyeglass lenses via a computer program allowing a design, intricate facet cuts and stone placement on a computer lens model. Software may utilize a touch probe or laser scanner to gather point data from a previously designed lens, converting the data to a computer model. The data is then used to send signals to an articulated robotic arm holding a lens shape. The robotic arm receives the commands from the computer, moving and rotating the lens shape against an abrasive wheel, rotating cutter blade or rotating drill thereby duplicating the facet cuts, slots notches or depressions or other designs contained in the computer lens model. Varying pressure is applied by the articulated arm and various degrees of abrasiveness of the abrasive wheel.

5 Claims, 3 Drawing Sheets

FIG. 2

32 — providing a server central processing unit and first software executing therein for storing within a database in communication therewith, one or more eyewear lens shapes and design artistry for each of a plurality of lens styles and sizes

35 — providing at least one client central processing unit in communication with the server central processing unit to request of the server central processing unit one or more eyewear lens shapes and design artistry stored within the database of (32)

38 — selecting and retrieving one or more desired eyewear lens shapes and design artistry from among a group of shapes and designs stored in (32) and communicating the selected design and artistry to a second software program executing with he client central processing unit of (35)

40 — using the second software probing a eyewear lens blank to determine data-points defining the edge of the lens blank, the thickness of the lens blank and top of the lens blank

42 — converting the retrieved data-points of (40) to coordinates calculated from the probing of (40)

45 — utilizing the second software communicating retrieved lens design data of (38) to an articulated robotic arm pattern cutter controller

48 — cutting, facing, drilling adorning or otherwise sizing the retrieved lens design data to conform to the selected style of (38) and data-points probed in (40) and calculated in (42)

FIG. 3

(a) providing a server central processing unit and first software executing therein for storing within or retrieving from a database in communication therewith, one or more eyewear lens shapes and design artistry for each of a plurality of lens styles and sizes (b) providing at least one client central processing unit in communication with the server central processing unit to request of the server central processing unit one or more eyewear lens shapes and design artistry stored within the database of (a)

(c) selecting and retrieving one or more desired eyewear lens shapes and design artistry from among a group of shapes and designs stored in (a) and communicating the selected design and artistry to a second software program executing with the client central processing unit of (b)

(d) using the second software, probing an eyewear lens blank to determine data-points defining the edge of the lens blank, the thickness of the lens blank, the top of the lens blank, and either the true base convex or true base concave curvature of the lens (e) having the optical center of the lens blank serve as a center of rotation (f) utilizing the second software, communicating retrieved lens design data of (c) to an articulated robotic arm cutter controller (g) faceting, drilling, jewelling or otherwise sizing the retrieved lens design data to conform to the selected design and artistry of (c) and data-points probed in (d) without utilizing a physical pattern, including mechanically adjusting a lens pattern cutter, manually adjusting a rotatable pattern blank work table of the pattern cutter to offset the axis of rotation of the work table from the center of the lens blank, or automatically shifting a rotatable work table with respect to its rotational axis to provide an offset equal to the decentration of the lens optical center with respect to the selected lens blank (h) utilizing the second software, communicating said true base curvature of (d) to a robotic drilling apparatus and making one or more flush or otherwise perpendicular partial or complete bores to said lens surface

E-FACET OPTICAL LENS

REFERENCE TO PENDING APPLICATIONS

This application is not related to any pending application.

REFERENCE TO MICROFICHE APPENDIX

This application is not referenced to any microfiche appendix.

FIELD OF INVENTION

The present invention is directed in general to a system and method of making eyeglass lenses and more particularly to an automated system and method for cutting, faceting, drilling, adorning and otherwise particularizing eyeware lenses.

BACKGROUND OF INVENTION

As eyeware has become as much a matter of fashion as of function, eyeglass lens artistry and shapes have been constantly evolving. It is interesting to note that history would seem to repeat itself with respect to the style or adornment of eyeglass lenses. First came rimless, then to help distinguish one rimless from another came faceting. The industry eventually burned itself out due to the overwhelming cost and time involved in doing this type of work by hand. In recent years, rimless has resurfaced due to a new generation of drilled rimless machines. So it's a natural progression to develop a robotic machine to produce faceting and jewelling. Absent the benefit of a stylized frame wearers of rimless glasses were severely challenged to create an imaginative and stylized rendering whereby one pair of rimless glasses could be distinguished from another.

The present invention anticipates a return to the fashion of yesteryear and provides, discloses and claims an automated system and method for finishing lenses in a manner so as to include lens monogramming, the insetting of jewels, faceting and other design artistry.

The contemporary and prior art is replete with methods and apparatuses for finishing lenses and a summary of the most relevant art is herein immediately provided for contemplation. U.S. Pat. No. 2,354,772, filed Sep. 2, 1941 and issued Aug. 1, 1944 to H. L. Prange purports to disclose and claim eyeglass lenses around the peripheral edge of which a series of spaced ornamental etched.

The '772 patent relates to a manual process of etching the periphery of a lens and is absent any of the art enhancing features of the present invention.

U.S. Pat. No. 4,656,590, filed Nov. 7, 1984 and issued Apr. 7, 1987 purports to disclose and claim a system for computerizing eyeglass geometrical frame pattern records at a central location for access by eyeglass retailers or wholesalers. The pattern records are stored in a central computer in the form of instructions for a remote pattern cutting machine. The instructions define the shape of the eyeglass frame in quasi-polar coordinates, either using the frame's geometrical "box" center as the origin or using the optical center of the lens as the origin, the computer providing the desired conversion between the two pattern centers. The central computer may convert its frame shape data from the geometric center to the optical center, if desired, and then provide the necessary data for cutting the pattern. Data is transmitted to and is stored at a remote pattern cutter which then utilizes the data to cut a full-size pattern from a plastic workpiece or pattern blank.

The '590 patent is directed toward producing various lens patterns. The "patterns" of the '590 invention relates to the shape of the eyewear lens and consequently is absent any of the art enhancement features of the instant invention which speaks particularly to monogramming, drilling and adorning of an eyewear lens frames.

U.S. Pat. No. 5,053,971, filed Aug. 30, 1989, issued Oct. 1, 1991 to Wood et al. purports to disclose and claim a three axis, computer controlled apparatus for edging optical lenses maps the surfaces of a lens blank along a path defining the shape of the lens to be cut from the lens blank and from which mapping a computer controlled cutting algorithm directs the movement of the lens. The apparatus provides rough cuts, finished cuts and automatic placement of bevels and grooves along the edge of the lens with minimal operator intervention.

The '971 patent relates exclusively to edging an optical lens and consequently is absent any of the art enhancing features of the instant invention.

United States Publication No. 2003/0017794A1, filed Jul. 1, 2002 and published Jan. 23, 2003 to Kozakai et al. purports to disclose a lens processing management system for unitarily managing and controlling information of a plurality of types of lens processing machines for manufacturing a glass lens of predetermined shape from a glass material.

The '17794 publication appears limited to a means to control a plurality of lens processing machines and therefore is absent the particular art enhancing features disclosed and claimed by the instant invention.

U.S. Pat. No. 6,336,057B1, filed Apr. 29, 1999, issued Jan. 1, 2002 invented by Ibayashi. The invention purports to disclose and claim an eyeglass lens grinding a periphery of a lens, a lens holding system holds a lens while clamping the lens. A data input system inputs shape data of an eyeglass frame to which the lens is fitted, and layout data of the lens with respect to the eyeglass frame. An edge-position-data calculating system obtains edge position data of the lens after layout, on the basis of the data inputted by the data input system. A first measuring system measures an edge position of the lens before processing that is held by the lens holding system, on the basis of the edge position data obtained by the edge-position-data calculating system. A second measuring system measures an edge position of the lens after rough grinding, on the basis of the edge position data. A chamfering-process-data calculating system obtains chamfering process data for processing a corner portion of an edge of the lens after finish processing, on the basis of a result of measurement by the second measuring system. A chamfering process system having a chamfering grinding wheel processes the corner portion of the edge of the lens after the finishing processing. A chamfering-process controlling system controls the chamfering process system on the basis of the chamfering process data obtained by the chamfering-process-data calculating system.

The '057 patent appears to be dedicated towards performing a chamfering process (the processing of edge corner portions) of an eyeglass lens. Consequently, it is absent the art-enhancing features in Features, Disclosure and Claims of the instant invention.

U.S. Pat. No. 6,568,990, filed Jan. 16, 2001, issued May 27, 2003 invented by Siders et al. This patent maintains a method and system for the manufacture of ophthalmic lenses comprising a computer (102) and a CNC machining platform (104) in operative connection with the computer. The CNC machining platform includes a mounting stage (110), a block (106) in releasable connection with the mounting stage, and a machining tool (112). When an unfinished lens blank (108) is properly mounted on the block, the computer is operative to direct the CNC machining platform to perform both back surface generation and patternless edging of the lens blank in one machining cycle. The computer is further operative to direct the CNC machining platform to machine a lap tool for each lens and machine a block for receiving each lens. The block is machined by the platform to include scribe lines for facilitating proper alignment of lens blank.

The '990 patent relates exclusively to a method and system for the manufacture of ophthalmic lenses comprising a computer and a CNC machining platform in operative connection with the computer and consequently is absent any of the art enhancing features of the instant invention.

U.S. Pat. No. 4,557,076, filed May 4, 1984, issued Dec. 10, 1985, invented by Helbrecht. This patent purports to disclose and claim a machine which grinds the rims of spectacle lenses in accordance with data from an electronic data memory containing circumferential configuration of the spectacle lens.

The '076 patent appears absent any disclosure, teaching or claim with respect to the stylized art enhancing features of the instant invention.

U.S. Pat. No. 5,231,587, filed Sep. 29, 1992, issued Jul. 27, 1993, invented by Frost. The '587 patent purports to disclose and claim a lens surfacer. There is provided a lens generating apparatus and method for generating a surface on a lens blank, or other workpiece, of a wide range of shapes utilizing rotary movement of the components without a linear way system. The lens generating apparatus includes a rotatable tool support spindle which rotates a spheric tool about a first axis. The tool spindle is directly carried by a high torque, low inertia, direct drive servo motor which rotates the first rotational axis of the spherical tool about a second rotational axis. A work piece spindle holds the workpiece and rotates it about a third axis which generally lies in the same plane as the first axis. The work piece spindle is rotatably supported by a second high torque, low inertia, direct drive servo motor which rotates the third rotational axis about a fourth axis. The orientation of the first and third rotational axes are controlled by a CNC computer which controls the rotation of the two direct drive servo motors in dependence upon the rotational orientation of the workpiece. The spherical tool is controlled so as to follow a predetermined three dimensional tool path relative to the lens blank.

The '587 patent would appear limited to generating/creating an ophthalmic lens typically manufactured from a lens blank which has a previously formed spherical surface on a first side and appears devoid of any teaching disclosure or claim of the art enhancing features of the instant invention, particularly with respect to cutting, drilling or adorning rimless eyeglasses.

U.S. Pat. No. 4,394,099, filed Jan. 22, 1981, issued Jul. 19, 1983, invented by Santinelli. The '099 patent purports to disclose and claim a grinding machine of the type having a head mounted on a base and adapted to carry a lens pattern and a plastic lens having a base curvature, the head is capable of movement parallel to the axis of rotation of the plastic lens. A carriage is mounted on the base and is movable perpendicular to said axis of rotation, with the carriage having an improved rotatable cutter with a cutting edge made of a metal of high hardness and adapted to be rotated at high speed in order to be self-coolant. A hydraulic damper is mounted on the carriage and connected to the base for regulating the gravitational movement of the carriage towards the axis of rotation of the plastic lens, thus regulating the engagement of the metallic cutter blade with the periphery of the plastic lens. An improved bevel aligning device is provided having a base curve cam connected to the head and a cam tracer connected to the carriage, with the cam having a surface forming the same base curvature as the plastic lens. The tracer is in bearing contact with the surface of the cam and effects a movement of the head with the lens in a first direction to a position that aligns the center of the lens with the beveling device. The bevel aligning device further includes a biasing spring connected to the head and to the base for effecting movement of the head in a circular direction resulting in bearing contact of the surface of the cam against the tracer. By this arrangement, when the lens and the lens pattern are rotated, with the cutter being rotated at high speed, the carriage moves toward the axis of rotation thereby effecting an engagement of the cutter with the plastic lens periphery. The cutter cuts and edges the plastic lens while the beveling device simultaneously forms a bevel at the center of the periphery of the plastic lens.

U.S. Pat. No. 4,203,259, filed May 17, 1978, issued May 20, 1980, invented by Haddock. The '259 patent purports to disclose and claim an apparatus for simultaneously grinding a peripheral shape and edge surface upon a pair of ophthalmic lenses including an abrading wheel and first and second floating heads for rotatably supporting a pair of ophthalmic lenses on either side of the abrading wheel. The lenses are biased toward the wheel and are incrementally rotated about mutually parallel axes which lie parallel with a central longitudinal axis of the abrading wheel. An electronic control system is operably connected to each of the lenses and serves to control incremental rotation of each of the lenses as well as lateral engagement of the lenses with the central abrading wheel.

U.S. Pat. No. 6,020,983, filed Aug. 27, 1996, issued Feb. 1, 2000, purports to disclose and claim a method to the manufacture of eye covering articles bearing decorative reflection holograms. A method is provided for the manufacture of a holographic eye-covering article, the eye-covering article having an interference pattern corresponding to a predetermined three-dimensional object holographically prerecorded in a planar hologram layer, the interference pattern capable of being "played back" to an observer without being "played back" to said bearer. Functionality of the eye-covering article is effected in part by a light transmissive eyepiece, the eyepiece being uniaxially-curved and preferably comprising in sequence a thin web, a planar layer comprising the holographically prerecorded interference pattern, an adhesive layer, and a rigid optical substrate The '983 patent concerns itself with the manufacture of a holograph eye covering article and in so doing is absent the disclosure claims and teachings of the art enhancing features of the instant invention. While the '983 patent is adding art to a lens, it is a layer applied to the outside of a lens, rather than etched/ground into a lens as taught by the instant invention.

SUMMARY OF INVENTION

A system and method for artistically finishing lenses for eyeglass frames comprising: (a) providing a server central processing unit and first software executing therein for storing within, or retrieving from, a database in communication therewith, one or more eyewear lens shapes and design artistry for each of a plurality of lens styles and sizes; (b) providing at least one client central processing unit in communication with the server central processing unit to request of the server central processing unit one or more eyewear lens shapes and design artistry stored within the database of (a); determining "design" to download); (c) selecting and retrieving one or more desired eyewear lens shapes and design artistry from among a group of shapes and designs stored in the database of (a) and communicating the selected design and artistry to a second software program executing with the client central processing unit of (b); selecting "design" to download); (d) using the second software to laser or mechanically probe an eyewear lens blank to determine data-points defining the edge of the lens blank, the thickness of the lens blank and top of the lens blank; probing plano or prescription lens blank); (e) converting the retrieved data-points of (d) to coordinates with the coordinates calculated from the probing of (d); (f) utilizing the second software, communicating retrieved lens design data of (c) to an articulated robotic arm pattern cutter controller; and, (g) cutting, facing, drilling adorning or otherwise sizing the retrieved lens design data to conform to the selected style of (c) and data-points probed in (d) and calculated in (e).

BRIEF DESCRIPTION OF DRAWINGS

For a more complete understanding of the present invention, and the advantages thereof, reference is now made to the following descriptions taken in conjunction with the accompanying drawings, in which:

FIG. 2 is a non-limiting flowchart of sequence steps when practicing one embodiment of the present invention.

FIG. 3 is a non-limiting flowchart of sequence steps when practicing a second embodiment of the present invention.

DETAILED DESCRIPTION OF THE INVENTION

Figure 1:
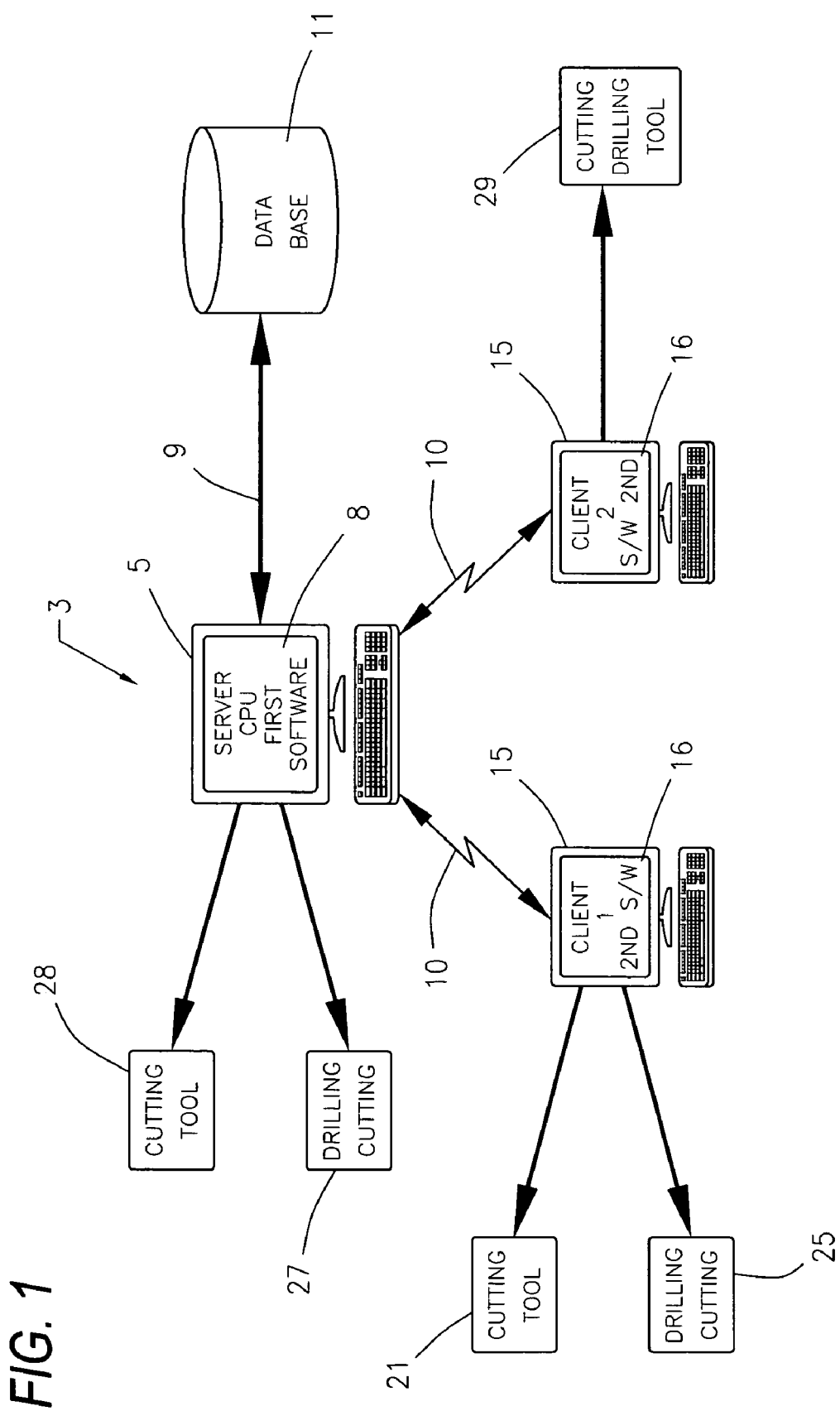
FIG. 1 is a system schematic illustrating primary hardware components of the instant invention as practiced in one embodiment.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

FIG. 1 illustrates a system schematic showing primary hardware components 3 of the instant invention as practiced in one embodiment. Turning now to FIG. 1.

In FIG. 1 it is seen where a server central processing unit 5 has executing under its dispatching control first software 8 which may be utilized either locally or remotely to retrieve or store one or more eyewear lens designs as data records/elements within a database 11. The database 11 may be locally attached to the server central processing unit 5 or remotely attached through any computer compatible communications link/network 9. As used herein, the terms eyewear lens design/designs is used synonymously and interchangeably with monogrammed, faceted or jewelry adorned designs.

FIG. 1 next illustrates at least one client central processing unit 15 in communication 10 with the server central processing unit 5. The central processing unit 15 has executing under its dispatching control second software 16 which requests of the server central processing unit 5 one or more eyewear lens shapes or design artistry records stored within database 11 and accessible to first software 8. In communication with the client central processing unit 15 is a cutting tool 21, combination cutting and drilling tool 29 or drilling tool 25. Said combination cutting tools or cutting/drilling tools are without limitation, those typically endowed with the functional capabilities of existing or future contemplated as follows: E40 (drilling), E60 (drilling, server communicating), E80 (drilling, server communicating, monogramming), EL100 (monogramming), E130 (drilling), E1 50 jewelling), E1 70 (faceting). The E may be replaced with ES in the 130-170 models to indicate the lens probed via scanning rather than touch. Model E40, E60, E80 are existing hardware/software that had its first commercial sale March 2004, Model EL100 is currently under testing and Models E130/ES1 30, E1 50/ES1 50, E1 70/ES1 70 are new hardware designs currently under design/revision.

FIG. 1 additionally reveals a drilling/cutting tool 27 or cutting tool 28 which is in area geographically proximate to the server central processing unit 5. The lens tools 21, 25, 27, 28 and 29 further includes a lens pattern cutter and microprocessor for operating the pattern tool in accordance with retrieved lens design/artistry communicated to the client central processing unit 15, having been first retrieved from database 11 via first software 8. As used herein, the term cutting/drilling tool/drilling tool are used interchangeably and synonymously. For purposes of full and enabling disclosure, these interchangeably and synonymously used terms are intended to describe hardware capability means sufficient to drill precision jewelry placement apertures, monogramming designs and fastening artwork upon an eyewear lens. The cutting drilling tools may additionally comprise a work table for receiving a lens blank and capability for geometrically centering the location of the blank having once probed said blank for axis, probe center and cutting center calibrations. Said probing to be further discussed in association with FIG. 2. The cutting drilling tools 29, 25, 21, 28 and 27 typically though not limitedly further include a robotic arm assembly responding to the microprocessor instruction means previously discussed. Conceptually viewed with respect to the functionality of the instant invention the robotic arm is to manipulate, rotate or otherwise orient at least one eyewear lens in a manner to allow precision faceting aperture drilling or monogramming.

FIGS. 2 and 3 illustrate non-limiting sequences of processing steps required to effectuate the practice of the instant invention. Turning now to FIG. 2. In FIG. 2 it is seen where a server central processing unit as previously discussed in association with FIG. 1 is provided and has executing under its dispatching control software to store within, or retrieve from a database in communication therewith one or more eyewear lens shapes and/or design artistry for each of a plurality of lens styles and sizes 32. At least one client central processing unit is in communication with the server central processing unit to request of the server central processing unit one or more eyewear lens shapes and design artistry stored within the database accessible to the server central processing unit 35. The client central processing unit in communication with the server central processing unit utilizes either a graphic user interface text or other dialog communication means to select one or more designed eyewear glass lens shapes or design artistry from amongst the group of shapes and artistry stored within the database accessible to the server central processing unit 38. The server central processing unit recognizing the selection indicated from the client central processing unit communicates the selected design artistry to the client central processing unit whereupon the second software program executing within the client central processing unit initiates a process referred to as "probing" to determine data points defining the edge of the lens, the thickness of the lens, and the top of the lens in preparation for perpendicular aperture drilling, monogramming, or faceting of the lens.

The process of probing as practiced by the present invention involves finding the edge of the lens blank, the thickness of the lens and the top of the lens at a point or points where the cutting, monogramming or drilling event will take place. The probe, which may consist of either mechanical contract probe (switch) or any combination of laser/infrared non-contact position locating technologies is anticipated and referenced for use by the instant invention. The probe is first moved to a desired distance above or below the X axis center of the lens.

The probe is next moved to a maximum lens diameter plus a safety margin along the Y axis and then next lowered into position and moved along the Y axis towards the center of the lens until the probe triggers as configured in the software of the invention with a default value of 30 mm. The Y axis is already part of the vacuum chucking mechanism to allow the lens to turn directionally. Contact mechanical probe registers contact, or non-contact probe indicates distance to object. When the probe triggers, a Y axis distance from the center has been determined. Probe is then moved very intentionally outward from the center until the probe no longer triggered and is moved slowly upward until the probe triggers again. When the second triggering event takes place, the bottom of the lens pattern has been identified. The probe then continues to move upward until the probe stops triggering and thus indicating the top of the lens. The difference between these two Z-axis locations and a compensation factor identifies the thickness of the lens at the edge. Probe continues upward to clear lens and move inward along the Y-axis until it is positioned over the point where the actual cutting will be performed 40.

Having once completed the probing operation, the data points identified as a result of the probing exercise are then converted to coordinates calculated according to the probing identification sequence 42. The data points relative to lens size, thickness, curvature and axis determination are next communicated to an articulated robotic arm pattern cutter controller 45 and cutting, facing, drilling, adorning or otherwise sizing the retrieved lens design to conform to the selected style of lens selected and data points probed and calculated.

A non-limiting example of dialog and process steps for drilling, monogramming or faceting the eyewear lens follow.

Drilling Process Steps

1. Prompt user for Material, Mfg, Name, Size, FrontCurve, Sides.
2. Confirm drill is in safe mode (cover closed, lenses in place).
3. Home CNC motors.
4. Probe first event on left temporal side for edge.
5. Move probe head over first event position.
6. Probe top of lens.
7. Move cutting head into position over first event.
8. Cut first event and subsequent relative events.
9. Probe any other events on the left temporal side.
10. Repeat 4 through 9 for left nasal side.
11. Repeat 4 through 9 for right nasal side.
12. Repeat 4 through 9 for right nasal side.
13. Move tray to loading position.

Monogramming Process/Dialog Steps

1. Prompt user to lay out characters on virtual representation of the lens in software. Each character represents a text file with a language consisting of vector coordinates laying out a grid and indicating where in the grid to move to. The character can then be sized an online screen indicating the diameter of the character to be made.
2. Confirm drill is in safe mode (cover closed and lenses in place).
3. Home CNC motors.
4. Probe left temporal side for edge.
5. Probe top of lens at a diagonal from where event should be located towards center of lens the same length as the diameter of the character to generate (this derives the lowest point in the lens it should begin etching).
6. Move cutting head over lowest point, follow text file language for movement and then shut off cutting head.
7. Repeat 4 through 6 for left nasal side.
8. Repeat 4 through 6 for right nasal side.
9. Repeat 4 through 6 for right temporal side.

Facet Process/Dialog Steps

Monogramming Process/Dialog Steps

1. Retrieve shape from machinery interface.
2. Select type of monogramming from layout design used in E80 models or from online server database. Stretch layout design onto retrieved shape/size to form image of monogram locations.
3. Place lens in laser mounting platform.
4. Close lid.
5. Hit Start in software.
6. Software sends created image to laser etching device which burns monogram into the front surface of the lens.
7. Robotic arm moves to loading platform (vacuum mount) and secures vacuum mount.
8. Lens is lifted off of loading platform and moved to probing platform.
9. Lens is moved slowly inward towards probe at the exact middle point of the vacuum mount. When triggered, lower outward position of lens has been reached. Lens is moved up and slightly inward then moved slowly downward until probe is triggered. This gives the bottom of the lens.
10. Lens is moved out and then moves diagonally towards probe. When triggered this gives the 45 degree position of lens. Bottom position is performed just like 8. Lens is moved out and then the lens is moved in from the side, retrieving the 90 degree position of the lens (along with bottom position checking). The same procedure is repeated for the opposite side of the lens for the 45 and 90. ES (non-contact) models will probe more degrees.
11. These probe positions, combined with the shape data from the machinery interface gives an accurate size layout of the lens. The selected faceting template is then overlaid in software.
12. The lens is moved by the robotic arm to grinding wheel number 1 (hardest grit). The robotic arm twists to give the angle defined by the faceting template and slowly moves inward towards grinding wheel. The robotic arm then moves out, rotates lens, and continues the in/out/rotate motion. The amount moved in is the distance from the center of the lens plus the calculated edge of the lens, minus the faceting amount that was downloaded.
13. When all facets are complete, the robotic arm moves the lens to grinding wheel number 2 which contains a slightly finer grinding wheel and continues the in/out/rotate motion only removing more material.

14. Finally the lens is moved to grinding wheel number 3 and proceeds with the polishing, using an even finer grinding wheel, using the same in/out/rotate steps as 10/11 with a slightly more inward movement.
15. Lens is placed on rectangular finishing platform.

Jewelling Process/Dialog Steps

1. Retrieve shape from machinery interface.
2. Select type of jewelling from online database.
3. Mount lens by placing chuck in vacuum mount.
4. Put vacuum mount in loading platform with top of lens facing user, press firmly down to vacuum seal lens.
5. Hit Start in software.
6. Robotic arm moves to loading platform (vacuum mount) and secures vacuum mount.
7. Lens is lifted off of loading platform and moved to probing platform.
8. Lens is moved slowly inward towards probe at the exact middle point of the vacuum mount. When triggered, lower outward position of lens has been reached. Lens is moved up and slightly inward then moved slowly downward until probe is triggered. This gives the bottom of the lens.
9. Lens is moved out and then moves diagonally towards probe. When triggered this gives the 45 degree position of lens. Bottom position is performed just like 8. Lens is moved out and then the lens is moved in from the side, retrieving the 90 degree position of the lens (along with bottom position checking). The same procedure is repeated for the opposite side of the lens for the 45 and 90.
10. These probe positions, combined with the shape data from the machinery interface gives an accurate size layout of the lens. The selected jewelling template is then overlaid in software.
11. The lens is moved by the robotic arm to the vertical drill bit. The robotic arm twists to give the angle defined by using an even finer grinding wheel.

Drilling Process/Dialog Steps

1. Retrieve shape from machinery interface.
2. Select type of drilling from online database.
3. Mount lens by placing chuck in vacuum mount.
4. Put vacuum mount in loading platform with top of lens facing user, press firmly down to vacuum seal lens.
5. Hit Start in software.
6. Robotic arm moves to loading lens is lifted off of loading platform and moved to probing platform.
7. Lens is lifted off of loading platform and moved to probing platform.
8. Lens is moved slowly inward towards probe at the exact middle point of the vacuum mount. When triggered, lower outward position of lens has been reached. Lens is moved up and slightly inward then moved slowly downward until probe is triggered. This gives the bottom of the lens.
9. Lens is moved out and then moves diagonally towards probe. When triggered this gives the 45 degree position of lens. Bottom position is performed just like 8. Lens is moved out and then the lens is moved in from the side, retrieving the 90 degree position of the lens (along with bottom position checking). The same procedure is repeated for the opposite side of the lens for the 45 and 90.
10. These probe positions, combined with the shape data from the machinery interface gives an accurate size layout of the lens. The selected drilling template is then overlaid in software.
11. The lens is moved by the robotic arm to the vertical drill bit. The robotic arm twists to give the angle defined by the drilling template relative to the base curve of the front of the lens and slowly moves the lens down onto the drill bit to completely penetrate the lens. The template will indicate any additional shape that may be required to be drilled after the initial hole is drilled, the robotic arm will be manipulated to create this shape (larger hole, notch, line). The arm then withdrawals the lens from the bit and moves to the next template defined location.
12. When all drills are complete, the robotic arm moves the lens to the rectangular finishing platform.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method for finishing lenses for eyeglass frames, comprising:
    (a) providing a server central processing unit and first software executing therein for storing within or retrieving from a database in communication therewith, one or more eyewear lens shapes and design artistry for each of a plurality of lens styles and sizes;
    (b) providing at least one client central processing unit in communication with the server central processing unit to request of the server central processing unit one or more eyewear lens shapes and design artistry stored within the database of (a);
    (c) selecting and retrieving one or more desired eyewear lens shapes and design artistry from among a group of shapes and designs stored in (a) and communicating the selected design and artistry to a second software program executing with the client central processing unit of (b);
    (d) using the second software, probing an eyewear lens blank to determine data-points defining the edge of the lens blank, the thickness of the lens blank, the top of the lens blank, and either the true base convex or true base concave curvature of the lens;
    (e) utilizing the second software, communicating retrieved lens design data of (c) to an articulated robotic arm cutter controller;
    (f) faceting, drilling, jewelling or otherwise sizing the retrieved lens design data to conform to the selected design and artistry of (c) and data-points probed in (d); and
    (g) utilizing the second software, communicating said true base curvature of (d) to a robotic drilling apparatus and making one or more flush or otherwise perpendicular partial or complete bores to a surface of said lens blank.

2. The method of claim 1 further comprising having the optical center of the lens blank serve as a center of rotation.

3. The method of claim 1 wherein the step of faceting, drilling, jewelling or otherwise sizing the retrieved lens design data to conform to the selected design and artistry of (c) and data-points probed in (d) further comprises a mechanical adjustment of a lens pattern cutter.

4. The method of claim 1 wherein step of faceting, drilling, jewelling or otherwise sizing the retrieved lens design data to conform to the selected design and artistry of (c) and data points probed in (d) further comprises manually adjusting a lens work table to offset the axis of rotation of the work table from the center of the lens blank.

5. The method of claim 1, wherein the faceting, drilling, jewelling, or otherwise sizing the retrieved lens design data to conform to the selected style of (c) and datapoints probed in (d) further comprises automatically shifting a rotatable work table with respect to its rotational axis to provide and offset equal to the decentration of the lens optical center with respect to the selected lens blank.

* * * * *